Patented Jan. 19, 1943

2,309,017

UNITED STATES PATENT OFFICE 2,309,017

TERPENE ETHER

Jacob M. Schantz, Wilmington, Del., assignor to Hercules Powder Company, Wilmington, Del., a corporation of Delaware No Drawing. Application July 27, 1940, Serial No. 348,021

12 Claims. (Cl. 260—611)

This invention relates to the preparation of terpene ethers and more particularly to the preparation of glycol and other polyhydric alcohol terpene ethers.

In Humphrey U. S. Patent No. 2,136,011, there is disclosed the production of a terpene ether containing one or more unreacted hydroxyl groups in the aliphatic radical, such as the reaction product obtained by the addition of ethylene glycol to a double bond of an unsaturated terpene compound such as alpha-pinene. However, such a product contains a large proportion of the diterpene ether of glycol wherein two terpene hydrocarbon radicals are attached one at each end of the dimethylene (—CH$_2$.CH$_2$—) radical.

It is an object of the present invention to devise a method for the preparation of an ether of a terpene radical and a hydroxyl substituted organic radical.

Another object is to provide for the direct preparation of such an ether.

Another object is to prevent or, to a large extent, minimize the formation of di-terpene ethers whereby the resulting ether has its hydroxyl group free or unetherified. Numerous other objects of the present invention will more fully hereinafter appear.

I have discovered that an ether of a radical of a terpene compound and a hydroxyl substituted aliphatic hydrocarbon radical may be readily prepared by treating an ether of a radical of a terpene compound and a halogen substituted organic radical with an aqueous material such as an aqueous solution or mixture of an alkaline agent such as an alkali metal hydroxide, an alkali metal carbonate, an alkali metal bicarbonate, an appreciably water-soluble alkaline earth metal hydroxide, etc. In this way, the direct preparation of the monoterpene ethers is facilitated and the formation of the di-terpene ethers is prevented. Thus, a higher yield of the desired monoterpene ethers is obtained and the product is more suited to those uses which depend upon the content of mono-terpene ethers. In addition, the higher yield of the desired product produced in accordance with the present invention is very advantageous and results in less waste of raw material than previous processes.

As the starting material, I may use any ether of a terpene compound and a halogen substituted organic radical. However, I prefer to use an ether of a radical of a terpene hydrocarbon and a beta halogen substituted aliphatic organic radical such as terpinyl beta-chloroethyl ether. Terpinyl beta-chloroethyl ether may be made for example in the manner described in the copending application of Donald H. Sheffield, Serial No. 301,761, filed October 28, 1939, now U. S. Patent No. 2,251,214 by reacting alpha pinene with ethylene chlorohydrin as follows: 400 g. of alpha pinene were added to 600 g. of ethylene chlorohydrin and 12 g. of 75% sulfuric acid and the mixture well agitated. The reaction which took place evolved heat; the temperature was maintained at 45° C. by cooling. After three hours the reaction was complete. Acid and excess ethylene chlorohydrin were then removed by two washes of about 500 g. each of 10% aqueous sodium carbonate solution. The resulting oil was then fractionated into two components by distillation. One fraction consisted of terpene hydrocarbons. The other fraction consisted essentially of terpinyl beta-chloroethyl ether.

Instead of terpinyl beta-chloroethyl ether I may employ as the starting material other ethers of a terpene radical and a beta-substituted organic radical. The terpene radical is subject to wide variation, and may for example be the bornyl radical, the isobornyl radical (as where camphene is reacted with ethylene chlorohydrin), the fenchyl radical, and the radical present in the ether formed by reacting with a chlorohydrin such terpene compounds as menthene, dipentene, terpinene, terpinolene, phellandrene, sylvestrene, alpha terpineol, beta terpineol, or any of the p-menthenols, or other unsaturated monocyclic terpene alcohol, or mixtures thereof, any unsaturated complex cyclic terpene capable of isomerization to an unsaturated monocyclic terpene compound such as alpha pinene, carene, etc., or other unsaturated polycyclic terpene such as nopinene, bornylene, alpha fenchene, sabinene, sabinol, thujene, borneol, isoborneol, fenchyl alcohol, etc. The terpene radical may be saturated such as p-menthyl, etc. or unsaturated.

I prefer to use the terpene ethers of beta-halo-substituted aliphatic radicals such as ethyl, propyl, isopropyl, n-butyl, sec. butyl, tertiary butyl, isobutyl, normal amyl, secondary normal amyl, primary isoamyl, secondary isoamyl, triethyl methyl, tertiary amyl, or any of the amyl radicals, etc. I prefer to use the beta-halo-substituted ethyl group because of the commercial availability of ethylene chlorohydrin. Thus the the preferred group comprises the terpene ethers of glycerin monochlorohydrin (either the alpha or the beta form), of glycerin dichlorohydrin (either the alpha or the beta form), 2-chloropropyl terpene ethers (prepared by reacting the terpene with 2-chloropropanol-1), 2-chloro-1-methyl-ethyl terpene ethers or beta-chloroisopropyl ethers (prepared by reacting the terpene with 1-chloropropanol-2), terpene ethers made from butylene chlorohydrins such as beta-chlorobutyl terpene ethers (made by reacting the terpene with 2-chloro-1-hydroxy-butane), 2-chloro-1-methyl-propyl terpene ethers (made by reacting the terpene with 3-chloro-2-hydroxybutane), 2 - chloro - 2 - methyl - propyl terpene ethers (made by reacting the terpene with 2-chloro-2-methyl propanol), beta-chloroamyl terpene ethers prepared by reacting terpenes with amylene chlorohydrins, and higher ethers. It is preferred to use those terpene ethers which are made by reacting the unsaturated terpene with a chlorohydrin in which the chlorine and the alcohol group are on adjacent carbon atoms due to the ease with which such chlorohydrins are prepared from the readily available olefines. Use of such chlorohydrins results in the production of ethers in which the chlorine substitution is on the second carbon from the carbon joined to the ether oxygen atom.

While it is preferred to use beta-halo-substituted ethers other halo-substituted ethers may be used provided that the halogen substitution is on a carbon atom removed by at least one carbon atom from the ether oxygen atom. The use of halo-substituted ethers in which the halogen substitution is on a carbon atom more than twice removed from the ether oxygen atom is in general not feasible because such ethers are difficult to prepare and the halohydrins in which the OH and halogen groups are on non-adjacent carbon atoms are not commercially available or easily prepared.

While it is preferred to employ ethers in which the organic radical, in which the halogen substitution is made, is an aliphatic radical containing at least two carbon atoms such as ethyl, propyl, butyl, amyl, hexyl, heptyl, octyl, lauryl, pentadecyl, etc., other radicals may be employed though less preferably, such as alicyclic radicals such as cyclohexyl, etc., aryl radicals such as phenyl, etc. However in view of the difficulty of preparing terpene ethers of such halo-substituted radicals, their use is not preferred.

Where chlorine substitution is referred to, bromine or iodine may be employed. However in view of the fact that iodohydrins cannot be directly or conveniently prepared, the iodine substituted ethers are not feasible for use as a starting material. Instead of a single substitution of a halogen on the alkyl group, two halogen atoms may be substituted on the same or on different carbon atoms of the alkyl group of the ether.

The invention may be carried out by admixing the terpene ether of the halogen substituted organic radical with an aqueous solution or suspension of an alkali of suitable type, followed by agitation of the mixture so as to cause intimate contact of the reacting components and subjection of the mixture to an elevated temperature for a prolonged period of time. After the reaction has taken place to the desired extent, the terpene ether of the hydroxyl substituted organic radical may be recovered in any desired manner and may be purified if desired. The purification may, for example, be carried out by distillation under reduced pressure.

It is preferred to employ an aqueous solution of an alkali to bring about the reaction. Examples of alkaline materials which have been found suitable are the alkali metal hydroxides, such as, sodium, potassium and lithium hydroxide, the alkali metal carbonates such as, sodium and lithium carbonate, the alkali metal bicarbonates such as sodium and potassium bicarbonate, and the alkaline earth metal hydroxides, namely, calcium hydroxide, barium hydroxide and strontium hydroxide. Of these materials, the alkali metal hydroxides are preferred because of their effectiveness, and of the alkali metal hydroxides sodium hydroxide is preferred on account of its cheapness. The stronger alkaline materials such as sodium and potassium hydroxide are also more suitable in the case of a primary halogen group. Where the raw material contains a secondary halogen group, somewhat weaker alkalies such as the alkali metal carbonates, alkali metal bicarbonates or alkaline earth metal hydroxides may be employed. In many cases, tertiary halogen reacts still more readily than the secondary halogen, and water alone will often bring about the desired conversion of an ether containing a tertiary halogen group to a hydroxyl substituted terpene ether although an aqueous alkali is preferred because of increased speed. From the foregoing, it will be seen that weaker alkalies such as the alkaline earth metal hydroxides, the alkali metal carbonates, very dilute sodium or potassium hydroxide or water alone may be employed to bring about the desired reaction.

In addition to the effect of the position of the halogen group on the radical, and the effect imparted by whether it is primary, secondary, or tertiary, the nature of the halogen in the halogen group controls the ease with which the reaction takes place. A bromine group reacts less readily than an iodine group and a chlorine group reacts still less readily than a bromine group.

The concentration of the aqueous alkaline material may vary within wide limits, depending upon the difficulty with which the reaction is effected, for example from 0% up to about 60 or 70% and preferably from about 1% to about 50%. In the case of a primary group, such as is present in terpinyl beta chloroethyl ether, this concentration can range from about 5% to about 40%, and preferably between about 10% and about 30%.

The amount of alkaline material employed may range from about 1.1 to about 10 mols of alkali per mol of terpene chloro ether taken, in the case of a primary chlorine group. The preferable range is from about 1.5 to about 3 mols of alkali per mol of chloro ether. These mol ratios would be doubled in the case where the terpene contained two ether linked halogen substituted hydrocarbon radicals.

The temperature employed in carrying out the reaction may vary within wide limits depending upon the reactivity of the particular raw material taken, the concentration of the aqueous alkali, the amount of alkali employed based on the weight of the raw material, etc. In general, the temperature will range between about 100 and about 300° C. and preferably between about 150 and 200° C. in the case of the primary halogen substituted terpene ethers. Lower temperatures, say from room temperature to about 200° C. are suitable in the case of tertiary halogen substituted ethers. In the case of secondary substituted ethers, temperatures ranging from 50 to 250° C. may be employed. The temperature will also vary with the reactivity of the particular alkali employed. Thus, for example, in the case of primary chlorides, the reaction with the alkali metal carbonates and the alkaline earth metal hydroxides is much slower than with the alkali metal hydroxides so that with the former alkalies, higher temperatures are necessary than with the latter.

If desired, the process may be carried out under pressure in a suitable pressure-resisting vessel. The pressure employed may vary from atmospheric up to 100 atmospheres. However, since ordinarily the reaction takes place with satisfactory speed at atmospheric pressure, the use of such high pressures is generally not necessary. Where, however, the reaction does not proceed with the desired speed, it may be accelerated by the employment of elevated pressures.

If desired, solvents may be present in the reaction mixture, where the reactants or the product is viscous or in order to speed up the reaction. Inert solvents, such as, benzene, toluene, xylene, cyclohexane, petroleum hydrocarbon solvents, such as, V. M. & P. naphtha, gasoline, Stoddard solvent, dipentene, hydrogenated petroleum naphtha, etc. may be employed. Mutual solvents for all the reactants may be used. Solvents which are not inert may be employed. Thus, the utilization of aqueous ethyl alcohol reduces materially the yield of by-product resinous material, since it is a mutual solvent for the raw material, sodium hydroxide, water, and the product. By the use of a mutual solvent, the difficulty occasioned by the low solubility of the raw material in the aqueous media which causes the reaction to proceed less rapidly than desirable, may be overcome.

Below are given several specific examples showing methods of carrying out the present invention.

*Example 1*

50 g. (0.23 mol) of terpinyl beta-chloroethyl ether made by reacting alpha pinene with ethylene chlorohydrin in the presence of sulfuric acid in the manner described above, were admixed with a solution of 25 g. (0.625 mol) of sodium hydroxide in 150 g. of water. The mixture was placed in a shaking autoclave, heated to 180° C., and maintained at this temperature with continual agitation for 24 hours. Pressure developed during the treatment. Following the treatment, the mixture was allowed to undergo layer formation whereupon the oily layer was separated and distilled at 2 millimeters pressure. The distillate between 90 and 105° C. was a colorless oil. This product contained 1.1% chlorine, 6.2% OH as determined by acetylation, 8.9% OH as determined by the Zerewithoff method, and was estimated to contain about 80% of glycol monoterpinyl ether. The yield of glycol monoterpinyl ether was 70%.

The product before distillation was dark in color and contained 0.9% chlorine. The residue left upon distillation amounted to about 25% of the product before distillation and comprised a viscous dark-colored resin containing 0.2% chlorine.

*Examples 2 to 6*

Additional examples are indicated in the following table in which 50 g. lot of terpinyl beta-chloroethyl ether were reacted as in Example 1 to give glycol monoterpinyl ether, the conditions of reaction being as indicated in the table:

| Example | Alkali | Amount of water | Temperature | Time |
|---|---|---|---|---|
| | | Grams | ° C. | Hours |
| 2 | 25 g. NaOH | 150 | 180 | 24 |
| 3 | 25 g. NaOH | 150 | 180 | 17 |
| 4 | 25 g. NaOH | 150 | 180 | 7 |
| 5 | 25 g. Na$_2$CO$_3$ | 150 | 180 | 6.5 |
| 6 | 30 g. Ca(OH)$_2$ | 100 | 180 | 8 |

*Example 7*

50 g. of terpinyl beta-chloroethyl ether was added to a solution of 25 g. of sodium hydroxide, 70 g. of ethyl alcohol and 80 g. of water. The mixture was agitated 24 hours at 180° C. in a bomb. After washing the oily layer with water and distilling it under reduced pressure as in Example 1, a 5% resinous residue remained and the distillate contained no chlorine and appeared to be mainly glycol monoterpinyl ether with a small amount of glycol ethyl terpinyl ether. Apparently, conditions were such that the ethyl radical was substituted to a slight degree for the hydrogen of the hydroxyl of the glycol monoterpinyl ether, or that the ethoxy radical was substituted in part for the chlorine group of the raw material. The use of aqueous ethyl alcohol as the solvent greatly reduced the yield of resinous by-products and is not disadvantageous for many uses because for many purposes a mixture of glycol monoterpinyl ether and glycol ethyl terpinyl ether is satisfactory.

From the foregoing, it will be seen that the present invention makes possible the ready production of glycol monoterpinyl ether and related compounds without any etherification by the terpene radical of the second hydroxyl group in the aliphatic chain. Numerous other advantages of the process of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. A process of preparing an ether of a radical of a terpene compound and a hydroxyl substituted organic radical which comprises reacting an unsaturated terpene compound with a halogen substituted aliphatic alcohol to form an ether of a radical of a terpene compound and a halogen substituted organic radical, and reacting the ether thus formed with an aqueous alkaline medium to form said ether of a radical of a terpene compound and a hydroxyl substituted organic radical.

2. A process of preparing an ether of a radical of a terpene compound and a hydroxyl substituted organic radical which comprises reacting an unsaturated terpene compound with a halogen substituted aliphatic alcohol to form an ether of a radical of a terpene compound and a halogen substituted organic terpene radical, and reacting the ether so formed with an agent selected from the group consisting of water and aqueous alkaline media to form said ether of a radical of a terpene compound and a hydroxyl substituted organic radical.

3. A process of preparing glycol monoterpinyl ether which comprises reacting alpha-pinene with ethylene chlorohydrin to form a terpinyl beta-chloroethyl ether, and reacting the ether thus formed with an aqueous alkaline medium to form the glycol monoterpinyl ether.

4. A process of preparing an ether of a radical of a terpene compound and a hydroxyl substituted organic radical which comprises reacting an unsaturated terpene compound with a halogen substituted organic alcohol to form an ether of a radical of a terpene compound and a halogen substituted organic radical, and reacting the ether thus formed with an aqueous alkaline medium to form said ether of a radical of a terpene compound and a hydroxyl substituted organic radical.

5. A process of preparing an ether of a radical of a terpene compound and a hydroxyl substituted organic radical which comprises reacting a dicyclic unsaturated terpene compound with a halogen substituted organic alcohol to form an ether of a radical of a terpene compound and a halogen substituted organic radical, and reacting the ether thus formed with an aqueous alkaline medium.

6. A process of preparing glycol monoterpinyl ether which comprises reacting dipentene with ethylene chlorohydrin to form a terpinyl beta-chloroethyl ether, and reacting the ether thus formed with an aqueous alkaline medium to form the glycol monoterpinyl ether.

7. A process of preparing glycol monoterpinyl ether which comprises reacting terpinolene with ethylene chlorohydrin to form a terpinyl beta-chloroethyl ether, and reacting the ether thus formed with an aqueous alkaline medium to form the glycol monoterpinyl ether.

8. A process of preparing an ether of a radical of a terpene compound and a hydroxyl substituted organic radical which comprises reacting an unsaturated terpene compound with a halogen substituted organic alcohol to form an ether of a radical of a terpene compound and a halogen substituted organic radical, and reacting the ether thus formed with water containing an alkaline agent selected from the group consisting of the alkaline metal hydroxides, carbonates and bicarbonates, and the alkaline earth metal hydroxides.

9. A process of preparing an ether of a radical of a terpene compound and a hydroxyl substituted organic radical which comprises reacting an unsaturated terpene compound with a halogen substituted organic alcohol to form an ether of a radical of a terpene compound and a halogen substituted organic radical, and reacting the ether thus formed with water containing an alkaline agent selected from the group consisting of the alkali metal hydroxides, carbonates and bicarbonates, and the alkaline earth metal hydroxides, the amount of said alkaline agent ranging from about 1.1 to about 10 mols per mol of said ether.

10. A process of preparing an ether of a radical of a terpene compound and a hydroxyl substituted organic radical which comprises reacting an unsaturated terpene compound with a halogen substituted organic alcohol to form an ether of a radical of a terpene compound and a halogen substituted organic radical, and reacting the ether thus formed with water containing an alkaline agent selected from the group consisting of the alkali metal hydroxides, carbonates and bicarbonates, and the alkaline earth metal hydroxides, the amount of said alkaline agent ranging from about 1.5 to about 3 mols per mol of ether, per ether-linked halogen substituted organic radical in said ether.

11. A process of preparing an ether of a radical of a terpene compound and a hydroxyl substituted organic radical which comprises reacting an unsaturated terpene compound with a halogen substituted organic alcohol to form an ether of a radical of a terpene compound and a halogen substituted organic radical, and reacting the ether thus formed with water containing an alkaline agent selected from the group consisting of the alkali metal hydroxides, carbonates and bicarbonates, and the alkaline earth metal hydroxides, said alkaline agent being employed in an amount ranging from about 1.5 to about 3 mols per ether-linked halogen substituted organic radical in said ether, the concentration of said alkaline agent in the water of solution or mixture ranging from about 10 to about 30% by weight, at a temperature ranging from about 100° C. to about 300° C. for a period of time sufficient to bring about substantial formation of said ether of a radical of a terpene compound and a hydroxyl substituted organic radical.

12. A process of preparing an ether of a radical of a terpene compound and a hydroxyl substituted organic radical which comprises reacting an unsaturated terpene compound with a beta-chloro substituted aliphatic straight-chain alcohol to form an ether of a radical of a terpene compound for a beta-chloro substituted organic alcohol, and reacting the ether thus formed with an aqueous alkaline medium.

JACOB M. SCHANTZ.